United States Patent
Esmaeili et al.

(10) Patent No.: US 8,252,107 B2
(45) Date of Patent: Aug. 28, 2012

(54) SYSTEM AND METHOD FOR TREATING TAILINGS FROM BITUMEN EXTRACTION

(75) Inventors: Payman Esmaeili, Calgary (CA); Mainak Ghosh, Calgary (CA); Brian C. Speirs, Calgary (CA)

(73) Assignee: ExxonMobil Upstream Research Company, Houston, TX (US)

( * ) Notice: Subject to any disclaimer, the term of this patent is extended or adjusted under 35 U.S.C. 154(b) by 186 days.

(21) Appl. No.: 12/826,166

(22) Filed: Jun. 29, 2010

(65) Prior Publication Data

US 2011/0036272 A1 Feb. 17, 2011

(30) Foreign Application Priority Data

Aug. 17, 2009 (CA) ..................................... 2674660

(51) Int. Cl.
C04B 14/10 (2006.01)

(52) U.S. Cl. .................. 106/705; 106/DIG. 1; 501/145; 209/11; 423/111; 423/130; 423/328.1

(58) Field of Classification Search .................. 106/705, 106/DIG. 1; 501/145; 209/11; 423/111, 423/130, 328.1
See application file for complete search history.

(56) References Cited

U.S. PATENT DOCUMENTS

| | | | |
|---|---|---|---|
| 4,240,897 A | 12/1980 | Clarke | |
| 4,343,691 A | 8/1982 | Minkkinen | |
| 4,561,965 A | 12/1985 | Minkkinen | |
| 4,804,459 A | 2/1989 | Bartholic et al. | |
| 4,818,373 A | 4/1989 | Bartholic et al. | |
| 4,867,755 A | 9/1989 | Majid et al. | |
| 4,875,998 A | 10/1989 | Rendall | |
| 5,320,746 A | 6/1994 | Green et al. | |
| 5,539,140 A | 7/1996 | Davidovits | |
| 5,674,315 A | 10/1997 | Bareuther et al. | |
| 5,792,251 A | 8/1998 | Smiley et al. | |
| 5,846,314 A | 12/1998 | Golley | |
| 6,004,069 A | 12/1999 | Sudbury | |
| 6,358,403 B1 | 3/2002 | Brown et al. | |
| 6,365,038 B1 | 4/2002 | Doron | |
| 2003/0221992 A1 | 12/2003 | Gorbaty et al. | |
| 2006/0027488 A1 | 2/2006 | Gauthier | |
| 2007/0272596 A1 | 11/2007 | Erasmus et al. | |
| 2008/0135241 A1 | 6/2008 | Iqbal et al. | |

FOREIGN PATENT DOCUMENTS

| | | |
|---|---|---|
| CA | 2149737 | 11/1996 |
| CA | 2217300 | 3/1999 |
| CA | 2587166 | 9/2007 |
| WO | WO 2007/102819 | 9/2007 |

OTHER PUBLICATIONS

Darling, Scott, CFB Technology: Clean, Economic and Efficient Steam and Power Generation for the Oil Sands Industry, Alstom, 2007, Part 1.
Darling, Scott, CFB Technology: Clean, Economic and Efficient Steam and Power Generation for the Oil Sands Industry, Alstom, 2007, Part 2.

(Continued)

*Primary Examiner* — Paul Marcantoni
(74) *Attorney, Agent, or Firm* — ExxonMobil Upstream Research Company Law Department

(57) ABSTRACT

A system and method for treating tailings from a bitumen froth treatment process such as TSRU tailings. The tailings are dewatered and then combusted to convert kaolin in the tailings into metakaolin. Calcined fines and heavy minerals may be recovered from the combustion products, namely from the flue gas and bottom ash.

27 Claims, 6 Drawing Sheets

OTHER PUBLICATIONS

Darling, Scott, CFB Technology: Clean, Economic and Efficient Steam and Power Generation for the Oil Sands Industry, Alstom, 2007, Part 3.

de Spot, Michel, et al., Metakaolin Study: Pre-Feasibility Review of the Potential for Developing Metakaolin From Oil Sands Operations for Use in Concrete, Ecosmart™ Concrete Project, Nov. 2003.

Duxson, Peter, The Structure and Thermal Evolution of Metakaolin Geopolymers, Phd Thesis, The University of Melbourne, 2006, Part 1.

Duxson, Peter, The Structure and Thermal Evolution of Metakaolin Geopolymers, Phd Thesis, The University of Melbourne, 2006, Part 2.

Duxson, Peter, The Structure and Thermal Evolution of Metakaolin Geopolymers, Phd Thesis, The University of Melbourne, 2006, Part 3.

Duxson, Peter, The Structure and Thermal Evolution of Metakaolin Geopolymers, Phd Thesis, The University of Melbourne, 2006, Part 4.

Kaminsky, Heather A.W., et al., Characterization of Heavy Minerals in the Athabasca Oil Sands, Minerals Engineering, vol. 21, pp. 264-271, 2008.

Shell Canada Ltd, Application for Approval of the Jackpine Mine Extraction Project, Sections 6.1-6.3, Dec. 2007.

Wong, R.C.K., et al., Calcined Oil Sands Fine Tailings As a Supplementary Cementing Material for Concrete, Cement and Concrete Research, vol. 34, pp. 1235-1242, 2004.

SYSTEM AND METHOD FOR TREATING TAILINGS FROM BITUMEN EXTRACTION

CROSS-REFERENCE TO RELATED APPLICATION

This application claims priority from Canadian Patent Application 2,674,660 filed 17 Aug. 2009 entitled SYSTEM AND METHOD FOR TREATING TAILINGS FROM BITUMENT EXTRACTION, the entirety of which is incorporated by reference herein.

FIELD OF THE INVENTION

The present invention relates generally to the field of processing of mined oil sands. More particularly, the present invention relates to the treatment of tailings from paraffinic froth treatment processes or a froth treatment process that generates tailings comprising hydrocarbons.

BACKGROUND OF THE INVENTION

Oil sands are deposits comprised of bitumen, clay, sand and connate water, and make up a significant portion of North America's naturally-occurring petroleum reserves. To produce a marketable hydrocarbon product from the oil sands, the bitumen must be recovered or extracted from the oil sands matrix. Depending on geographic location, bitumen may be recovered by surface mining or in-situ thermal methods, such as steam assisted gravity drainage (SAGD), cyclic steam stimulation (CSS), vapor extraction process (VAPEX), liquid addition to steam for enhancing recovery (LASER) or derivatives thereof.

Because the bitumen itself is a tar-like, highly viscous material, separating it from the sands poses certain practical difficulties. An example of a common extraction technique is known as a water-based extraction process, where hot water, air, and process aides are added to crushed ore at a basic pH to form a slurry. An oil-rich froth "floats" or rises through the slurry as a hydrocarbon phase which can be skimmed off from the top of a separation vessel. The result is an extract that typically comprises two parts: a hydrocarbon phase known as a bitumen froth stream, made up of bitumen, water and fine solids, and an aqueous phase known as extraction tailings, made up of coarse solids, some fine solids, and water. The bitumen froth typically comprises bitumen (approximately 60% by weight), water (approximately 30% by weight), and solids (approximately 10% by weight), and must undergo a froth treatment process to separate the organic content from the water and solid contaminants. Due to its high viscosity, the first step is typically the introduction of a solvent, usually a hydrocarbon solvent such as naphtha or a paraffinic solvent. This step is known as froth separation, and helps to accelerate the separation of solid particles dispersed within the froth by increasing the density differential between the bitumen, water, and solids as well as reducing the viscosity of bitumen. Separation is carried out by any number of methods, such as centrifugation or gravity separation. Paraffinic froth treatment has several advantages over naphtha-based treatment, as discussed in Canadian Patent Nos. 2,149,737 and 2,217,300. One example of a benefit is the partial rejection of asphaltenes: adding a paraffinic solvent to bitumen froth causes some of the asphaltene component of the bitumen extract to precipitate from the froth and consolidate with the solid components, such as minerals and clays. A further benefit of paraffinic froth treatment is that, as a result of the adsorption of water droplets and clays to the hydrophilic sites of the asphaltene molecules, the final bitumen product contains only a small amount of emulsified droplets and clay particles which can be sources of corrosion and catalyst poisoning. The details of one method of paraffinic froth treatment are set out in Canadian Patent No. 2,587,166 to Sury.

The result of the paraffinic froth treatment process is diluted bitumen and a second tailings stream, known as froth treatment tailings, made up of water, solids, and residual hydrocarbon (solvent, rejected asphaltenes, and un-recovered bitumen) which undergo further treatment to prepare the tailings for safe disposal. Dilution water is added to avoid foaming within the TSRU (described below) and also the blockage of associated tubings and internals The first step in this further treatment is to recover solvent through any number of processes known collectively as tailings solvent recovery. Recovered solvent may then be reused in the froth separation process. Tailings from a tailings solvent recovery unit (TSRU), known as TSRU tailings, are then disposed of Table 1 sets out an example of the composition of TSRU tailings:

TABLE 1

| TSRU Tailings Composition | |
|---|---|
| Component | Weight Percent |
| Maltenes | 1 |
| Asphaltenes | 5 |
| Solvent | 0 |
| Fines | 6.5 |
| Sands | 3.3 |
| Water | 84.3 |
| TOTAL: | 100 |

The specific properties of the tailings will vary depending on the extraction method used, but tailings streams are essentially spent water, asphaltenes, unrecovered hydrocarbon, reagents, and waste ore left over once the usable bitumen has been removed.

While effective, the treatment process requires the use of large quantities of heat, solvent, and water in the form of steam and process water (dilution water), which significantly increases the cost associated with recovery of petroleum from the bitumen-laden oil sands.

One known method of recovering the water is to simply direct the TSRU tailings into reservoirs known as tailings ponds, and allow the solid components to settle and separate from the water over time. Residual heat escapes into the atmosphere, while the tailings water is retained for future use, with some loss due to evaporation. This method is not preferred for at least three reasons. First, a significant amount of time is required for most of the solid materials to precipitate out of the tailings by operation of gravity alone. Secondly, it does not allow for the recovery of any of the large amount of energy contained within the tailings stream in the form of heat. The heat lost is high, as tailings dumped into the ponds are at temperatures between 70° C. and 90° C. Thirdly, tailings ponds do not permit recovery of any of the residual hydrocarbon component within the tailings.

Rather than simply disposing of TSRU tailings, it is desirable to recover a portion of the usable components of the TSRU tailings stream to reduce the overall cost of extracting petroleum resources from oil sands and improve the environmental performance. The energy and water recovered can ideally be reused in further steps of the extraction process or recycled to the TSRU to be used as dilution water. This has the advantage of improving the overall energy efficiency of the extraction process. It is further desirable to minimize the volume of tailings that must be disposed. By removing a certain amount of water from the tailings, the streams can be substantially reduced to minerals and unrecovered hydrocarbon.

Several attempts to recover heat, water, and other reagents from tailings streams are known. Methods are disclosed in U.S. Pat. Nos. 4,343,691, 4,561,965 and 4,240,897, all to Minkkinen. These patents are directed to heat and water vapor recovery using a humidification/dehumidification cycle. U.S. Pat. No. 6,358,403 to Brown et al. describes a vacuum flash process used to recover hydrocarbon solvents from heated tailings streams. There has been, however, a lack of success in effective water and energy recovery.

SUMMARY OF THE INVENTION

It is an object of the present invention to obviate or mitigate at least one disadvantage of known systems or methods.

In one aspect, the present invention provides a process for treating tailings from a bitumen froth treatment, such as TSRU tailings, to recover a portion of their water, energy, and residual hydrocarbon components. The treatment process requires the minimal use of energy in addition to the substantial amount of enthalpy already invested in prior stages of the bitumen extraction and froth treatment processes. However, enthalpy can be recovered from both the hot water via dewatering circuit and from the hydrocarbon component of the tailings themselves through combustion of the tailings. Thermal energy generated by this process can then be used in the extraction processes in order to help reduce the external energy requirement. This process also assists in the recovery of other usable materials from the tailings.

In one aspect, the present invention provides a method for treating tailings containing kaolin and hydrocarbons from a bitumen froth treatment process, comprising dewatering the tailings and combusting the hydrocarbons in the dewatered tailings stream in a combustion chamber. The combustion chamber is operated at a temperature sufficient to cause a chemical reaction converting kaolin into metakaolin. Small particles of metakaolin may be carried out of the combustion chamber with the flue gas as 'fly ash', while particles too large to be suspended in the flue gas may be recovered from the bottom ash. Usable materials such as water from tailings, heat from the combustion chamber, calcined fines, and heavy minerals can be recovered.

In another aspect, there is provided a system for treating tailings comprising kaolin and hydrocarbons from a bitumen froth treatment process, comprising a dewatering unit for removing water from a tailings stream and a combustion chamber, such as a circulating fluidized bed boiler, for combusting the dewatered tailings stream, carrying out a chemical reaction whereby kaolin converts to metakaolin, and recovering metakaolin from either the flue gas or bottom ash streams and. The system may also include elements for recovering usable materials such as water, heat from the combustion chamber, calcined fines and heavy metal oxides from fly and bottom ashes.

In another aspect, there is provided a method for treating tailings from a bitumen extraction or froth treatment process, the tailings comprising sand, clay comprising kaolin, and water, and hydrocarbons, the method comprising: dewatering the tailings to produce a dewatered tailings stream and a water stream; combusting the hydrocarbons in the dewatered tailings stream in a combustion chamber to cause a chemical reaction converting kaolin into metakaolin and to produce a flue gas and a bottom ash, the flue gas comprising metakaolin. The bottom ash may be used for solidifying or stabilizing bitumen extraction tailings. Alternatively, calcined fines may be separated from the bottom ash stream and used for solidifying or stabilizing bitumen extraction tailings, or as an additive to cement. Alternatively, metakaolin may be separated from the calcined fines and used for solidifying or stabilizing bitumen extraction tailings, or as an additive to cement. The fly ash, calcined fines recovered from the fly ash, or metakaolin separated from the calcined fines, may be used for solidifying or stabilizing bitumen extraction tailings, or as an additive to cement. The bitumen extraction tailings may comprise mature fine tailings, thickened tailings, a middling stream, naphthenic froth treatment tailings froth flotation tailings, or coarse tailings.

In another aspect, there is provided a system for treating tailings from a bitumen froth treatment process, the tailings comprising sand, clay comprising kaolin and water, and hydrocarbons, the system comprising: a dewatering unit for removing water from a tailings stream, producing a dewatered tailings stream and a tailings water stream, and a combustion chamber for combusting the dewatered tailings stream, carrying out a chemical reaction whereby kaolin converts to metakaolin, and producing a flue gas and a bottom ash stream, wherein the flue gas comprises metakaolin.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, in one embodiment, the present invention provides a method and system for treating TSRU tailings using combustion to recover usable solid components and steam. The following description sets out several embodiments of the present invention using the example of tailings produced from paraffinic froth treatment processes. However, the embodiments discussed herein are also applicable to other treatment processes for bitumen froth or another industrial application that results in combustible, kaolinite-bearing tailings.

Figure 1:
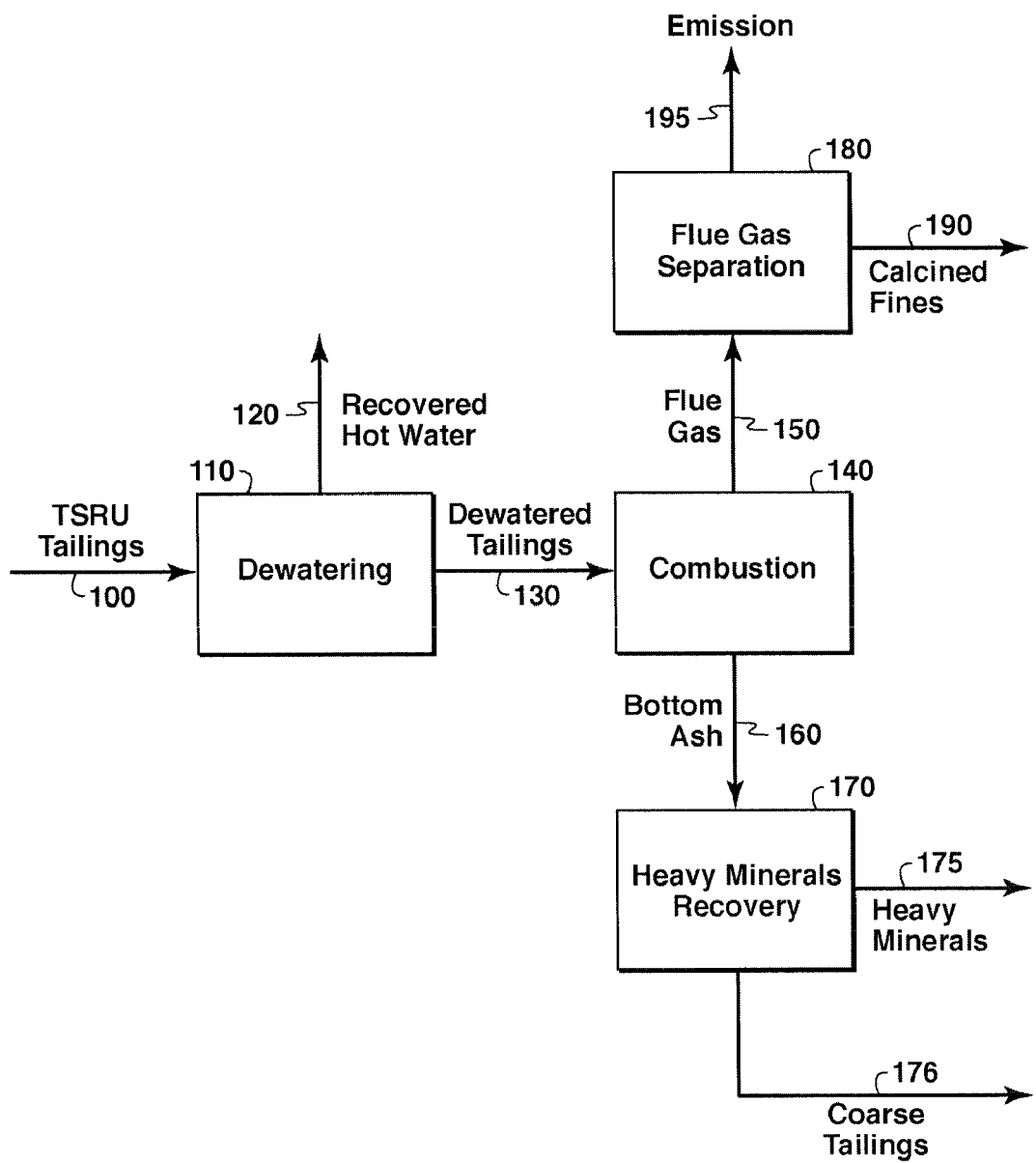
FIG. 1 is a flow diagram illustrating an overview of a method of tailings treatment according to one disclosed embodiment.

FIG. 1 shows a high-level outline of the steps involved in the tailings treatment process in accordance with one embodiment of the invention. Once froth separation tailings undergo tailings solvent recovery processing such as discussed above, they form a stream of TSRU tailings 100 comprising water, solid materials, unrecovered hydrocarbons, and unrecovered solvent. Dilution water is added to avoid foaming within TSRU and also the blockage of associated tubings and internals. In addition, the TSRU tailings contain a significant amount of heat energy, as they may be released from a TSRU at a temperature of approximately 70° C.-93° C., or about 90° C. Owing to the high specific heat capacity of water, much of the heat energy of the tailings is stored within the water portion of the tailings. As such, both the water and a significant portion of the enthalpy lost to TSRU tailings can be extracted from the tailings stream and used in, for example, other steps in the oil sands extraction process. Accordingly, one embodiment of the invention provides for a dewatering step 110 where recovered hot water 120 is extracted from the stream. The resulting dewatered tailings 130 is reduced in both volume and water content, so further treatment of these resulting dewatered tailings 130 may require less heat energy.

As noted above, TSRU tailings contain a substantial amount of hydrocarbon (i.e. asphaltenes, unrecovered bitumen and solvent). In accordance with one embodiment of the invention, these hydrocarbons can be used as a source of energy. Examples of dewatering methods are described below with reference to FIGS. 3 to 7. Further, using these hydrocarbons may mitigate the environmental challenge of tailings for disposal, since the amount of solvents and asphaltenes released into the environment can be significantly reduced. Accordingly, in one embodiment of the invention, dewatered tailings 130 undergo combustion 140 using the hydrocarbons as a fuel following dewatering 110. Combustion 140 may be more efficient as a result of dewatering 110, as dewatered tailings 130 will combust more readily owing to the removal of recovered hot water 120. Ammonia, urea, and limestone may be added to the combustion for emission control.

As noted above, a constituent element of the solid portion of TSRU tailings is kaolinite, or solids rich in kaolin. Kaolin, which has a chemical formula of $Al_2Si_2O_5(OH)_4$, undergoes dehydration at temperatures of approximately 500-1000° C. to form metakaolin according to the following chemical reaction:

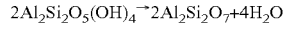

$$2Al_2Si_2O_5(OH)_4 \rightarrow 2Al_2Si_2O_7 + 4H_2O$$

Accordingly, during combustion 140, the kaolin content of dewatered tailings 130 will undergo the above dehydration synthesis to form metakaolin once the temperature during combustion is high enough to reach the activation energy threshold for the reaction. Combustion 140 results in two product streams: flue gas 150 and bottom ash 160.

In one embodiment, the metakaolin product of the reaction will form as a fine solid, and exit combustion 140 as part of flue gas 150. Heavier particles will settle and be removed with the bottom ash. Separation 180 is then used to extract calcined fines 190, including metakaolin, which has several industrial applications owing to their cementitious, or pozzolanic, properties. The emission 195 is also shown. Metakaolin is a well-known supplement for Portland cement; in addition, it is known to increase the comprehensive and flexural strengths of cement, and improves the resistance of concrete against corrosive chemicals and freeze-thaw conditions. Similarly, metakaolin may be used as a main ingredient of a geopolymer for stabilizing and solidifying waste streams. Accordingly, the calcined fines extracted from flue gas 150 and bottom ash may be used to treat other tailings streams, such as mature fine tailings (MFT), coarse tailings, or another suitable tailings streams resulting from the various stages of oil sands extraction processes. The remaining components of flue gas 150 are then released as emission 195, for example CO, $CO_2$, $SO_x$, $NO_x$, and $H_2O$, or are further treated.

Bottom ash 160 comprises the coarse tailings remnants from combustion 140, which may include sand, clays (including larger sized meta-kaolinite particles), minerals, heavy metal oxides, gypsum, and unreacted limestone. Heavy minerals are defined herein as minerals having a specific gravity greater than about 2.85, and including, without being limited to, such minerals as rutile, ilmenite, leucoxene, siderite, anatase, pyrite, zircon, tourmaline, garnet, magnetite, manzite, kyanite, staurolite, mica, and chlorite Among these, rutile and zircon are considered valuable materials; for example, zircon is particularly valued for its applications as an abrasive and an insulator as well as its refractory properties, while rutile is used in the preparation of pigments and refractory ceramics. One embodiment of the invention provides for heavy minerals recovery 170 to extract a portion of the valuable constituents of bottom ash 160. Examples of methods to remove heavy minerals 175 include gravity, magnetic, and electrostatic separation. Coarse tail 176 comprises the remaining minerals and clay portions left over following heavy minerals recovery 170, and may then be disposed of, used for tailings stabilization, or used for further separation of gypsum and unreacted limestone.

Figure 2:
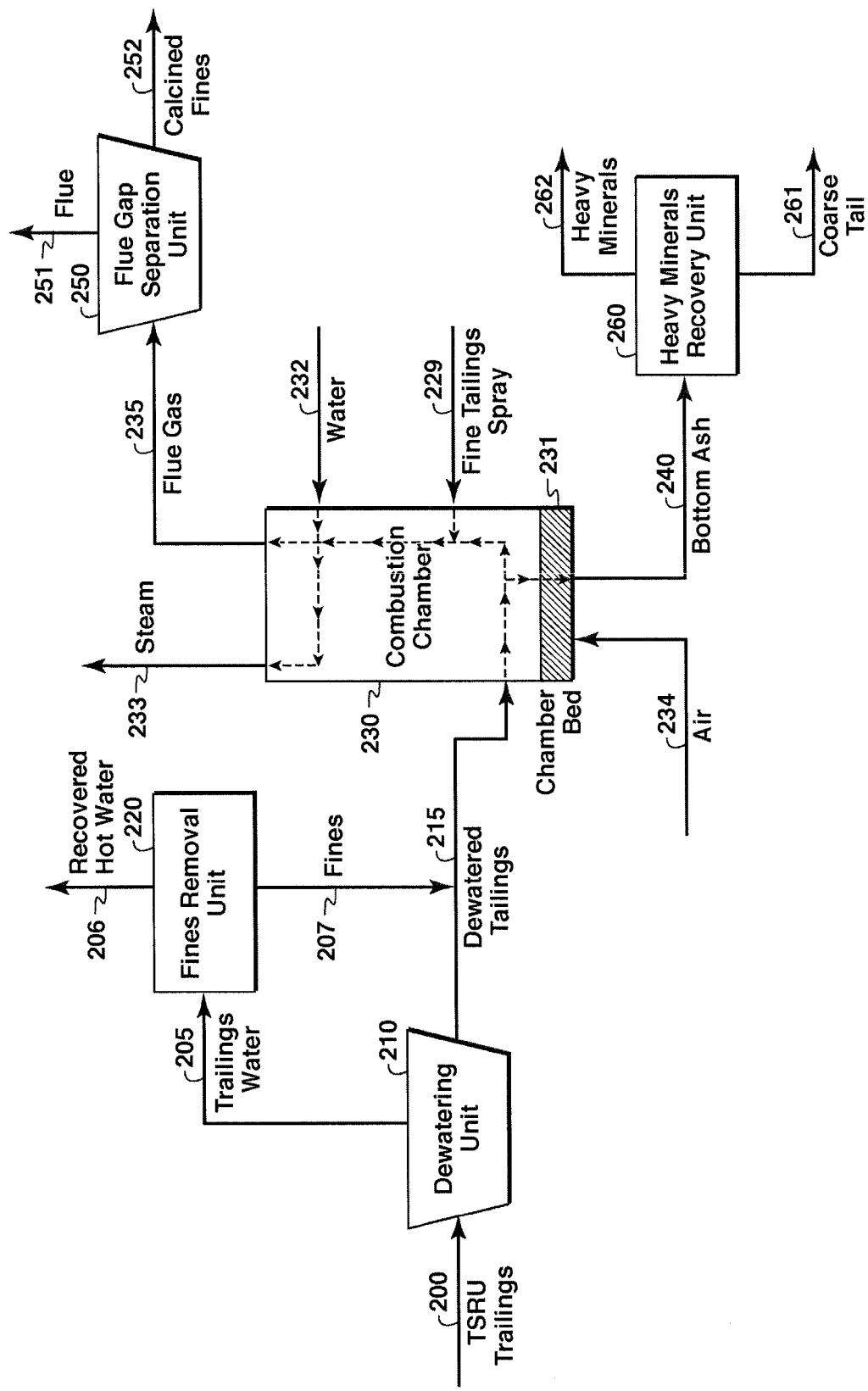
FIG. 2 is a schematic of an example of a tailings treatment system in accordance with one disclosed embodiment.

FIG. 2 shows a system in accordance with one embodiment of the invention. TSRU tailings 200 from bitumen paraffinic froth treatment processes enter dewatering unit 210, where a portion of, or much of, the water in the tailings stream is separated. The dewatering unit may be a sole dewatering unit or may comprise at least two dewatering units. Non-limiting examples of suitable dewatering operations methods using a hydrocyclone, centrifuge, filters, settling vessels, or thickeners, all with or without the addition of chemical aids; however, another process capable of removing water from a TSRU tailings stream may function within this embodiment of the invention. As a result of the dewatering, TSRU tailings 200 have been split into tailings water 205 and dewatered tailings 215. Tailings water 205 then optionally enters fines removal unit 220 to recover fine particulate matter that may not have been removed by dewatering unit 210. Examples of fines removal units include filters, centrifuges, thickeners, and cyclones. Examples of dewatering methods are described further below with reference to FIGS. 3 to 7. Recovered hot water 206 may then be used in any number of suitable applications. As noted above, TSRU tailings may be released from the TSRU at temperatures of approximately 90° C., so recovered hot water 206 may leave fines removal unit 220 with enthalpy that may be used in, for example, another step of the oil sands extraction and/or treatment processes that require heat energy. Further, the water itself may be reused in other extraction or treatment steps including, but not limited to, further froth treatments. The recovered water may be recycled to the TSRU to be used as dilution water. Any fines 207 recovered by fines removal unit 220 may then be added to dewatered tailings 215 and undergo additional treatment along with the rest of the solid components from dewatering unit 210.

Dewatered tailings 215 then enter combustion chamber 230. Optionally and preferably, combustion chamber 230 is a fluidized bed combustion chamber. Broadly speaking, fluidized beds are solid materials, usually particulate, that are subjected to certain conditions to cause them to exhibit the properties and behaviors of a fluid. In the fluidized bed combustion in accordance with this embodiment of the invention, solid fuels (shown as chamber bed 231) are suspended on an upwardly-blowing current of air 234, causing a tumbling action that mixes gas and solid. In one embodiment of the invention, chamber bed 231 is at least partially made up of particulate matter from the dewatered tailings themselves. The fluidized bed combustion should be operated at a temperature so as to form the metakaolin. Limestone, ammonia and urea may be added for emission control.

Dewatered tailings 215 contains hydrocarbon molecules such as asphaltenes rejected during paraffinic froth treatment, unrecovered bitumen and residual solvent that may not have been recovered by the TSRU. When ignited, these hydrocarbon components will combust within the chamber, releasing heat energy. As one of ordinary skill in the art will appreciate, fluidized bed combustion allows for effective reactions and transfer of heat. The presence of non-combustible solid material in combustion chamber 230 may not adversely affect the combustion process, and the presence of some water within the boiler feed (i.e. 215), which in this case is dewatered tailings 215, may reduce the combustion temperature in the chamber depending on the technology employed. In combustion processes, the presence of a certain amount of water moderates the flame or the bed temperature. Advantageously, this may reduce the amount of $NO_x$ formed during the combustion since a lower combustion temperature reduces the NOx generated from the combustion air. In one embodiment, combustion chamber 230 is a modified circulating fluid bed combustion boiler where the bed 231 comprises sand and fines.

According to another embodiment of the invention, heat generated during the combustion operation may be recovered. Water 232 is introduced to, for example, a series of pipes or a compartment within combustion chamber 230 so that it is in thermal contact with the interior of the combustion chamber. As the combustion proceeds, generated heat energy flows into water 232. As a result of heat transfer water 232 will convert to steam 233 and exit combustion chamber 230. Steam 233 may be at any pressure and temperature desired for use as to drive a steam turbine, as a heat and/or water source for any other step of the oil sands extraction or treatment processes or any other industrial process that may require it.

In some cases, there may be a high sulfur content in the tailings, particularly in the asphaltene components. As such, a $SO_x$ removal step may be considered for the design of any combustion process used in accordance with one embodiment of the invention. In a non-limiting example where combustion chamber 230 is a fluidized bed boiler, the introduction of limestone in the fluid bed may be effective for the $SO_x$ removal. In one embodiment of the invention, the presence of a caustic within the TSRU tailings stream can mitigate a $SO_x$ problem, as it is known that caustic reacts with $SO_x$. Caustic is a good absorber of acidic gases like $SO_2$ that will naturally form in the combustion process as the hydrocarbon in the tailings contains sulphur. Moreover, the solid content of TSRU tailings contains materials with similar molecular structures of natural zeolites; they may help to reduce $SO_x$ emissions during the process.

The combustion proceeds, burning the tailings and converting them to two streams: flue gas 235 and bottom ash 240. As discussed above, the kaolin clay component in the tailings will undergo dehydration synthesis to form metakaolin when the temperature inside the combustion chamber reaches the 500-1000° C. threshold. In one embodiment, fine tailings sourced from any stage of the oil sands extraction process (i.e. MFT, middlings, or flotation tailings) that produces kaolin-containing fine tailings 229 may be introduced into combustion chamber 230. In this manner, additional tailings can be added, thus increasing the kaolin content of the tailings in combustion chamber 230 and, consequently, the production of metakaolin by dehydration synthesis. Moreover, any residual hydrocarbon in the fine tailings will be combusted, recovering useful heat from an otherwise waste product. The produced metakaolin as well as other calcined fines, such as Illite and smectite that will emit from the combustion chamber as a portion of flue gas 235 or bottom ash 240.

It should be noted that the temperature in combustion chamber 230 may exceed 1000° C. during combustion. This may have a negative impact on the pozzolanic properties of the calcined fines; accordingly, one embodiment of the invention provides for a optimal design for the combustion for example, by using a staged combustion, primary, secondary, tertiary air addition, proper temperature distribution within the chamber can be achieved and the length of exposure of the calcined fines to high temperatures can be reduced, thus mitigating any damage to the fines. The addition of water, inert or near inert products (such as mature fine tailings (MFT) with a low hydrocarbon content) may also be admitted in various locations to assist in temperature control. In one embodiment, calcined fines contained within flue gas 235 are separated by flue gas separator unit 250 to form calcined fines 252. Non-limiting examples of appropriate separation devices include a cyclone and a bag house filter.

Following separation, flue gas 235 is reduced to solid-free flue gas 251, which may be made up of the gaseous components released during combustion. In a further embodiment, heat energy contained in flue 251 may be reused in other stages of the oil sands extraction/refinement processes. For example, flue 251 may be used to dry other tailings streams such as MFT using a spray dryer. A spray dryer is a type of dryer in which the materials to be dried are sprayed to the dryer and the water is removed by contacting with hot air or hot gas. In this case, hot gas can be flue gas. As noted above, bottom ash 240 comprises sand, gypsum, unreacted lime, and metakaolin. and may contain valuable heavy minerals. In one embodiment, bottom ash 240 are introduced into heavy minerals recovery unit 260 where they are subjected to recovery operations to retrieve as much usable and valuable components from the tailings as possible. Non-limiting examples of heavy minerals recovery unit 260 include devices typically used for electrostatic or magnetic separation techniques, although another suitable method for extracting heavy minerals from a coarse or fine particulate solid or coke may be used in additional embodiments of the invention. The resulting products from heavy minerals recovery unit 260 include heavy minerals 262 and coarse tail 261, which is mainly made up of sand, calcined fines, gypsum, unreacted limestone and impurities. Coarse tail 261 may then be disposed of or used in any appropriate manner.

Figure 3:
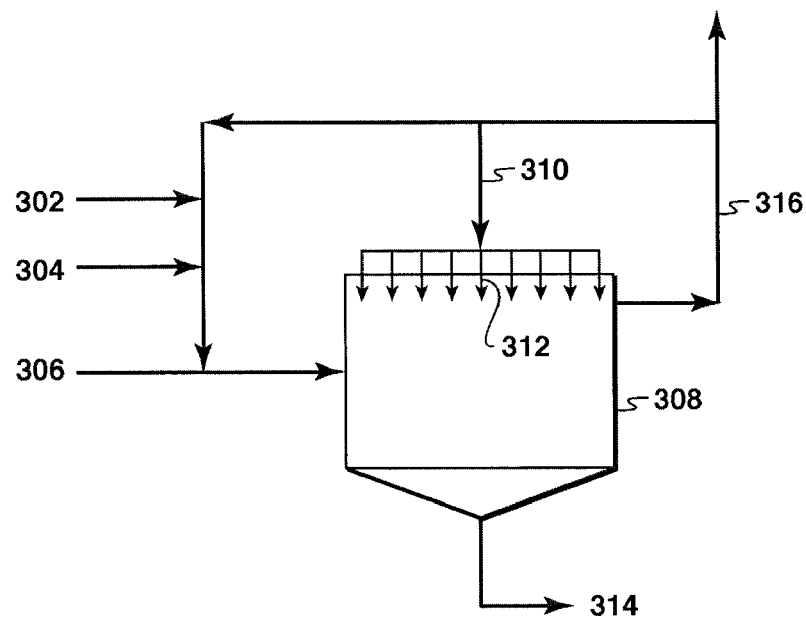
FIG. 3 is a schematic of an example of a dewatering process using a thickener unit in accordance with one disclosed embodiment.

FIGS. 3 to 9 show examples of dewatering and fines removal to prepare the feed for the combustion process described herein. FIG. 3 outlines a dewatering method where a flocculent 302 and a coagulant 304 are added to tailings 306 and this mixture is added to a thickener unit 308 in which the recovered water (explained below) 310 is sprayed 312. The dewatered tailings 314 are then sent to a combustion unit. Hot water 316 is removed from the thickener unit 308 and a portion of the hot water 316 is recycled for use as spray water 310 and is mixed with the flocculent 302, coagulant 304, and tailings 306.

Figure 4:
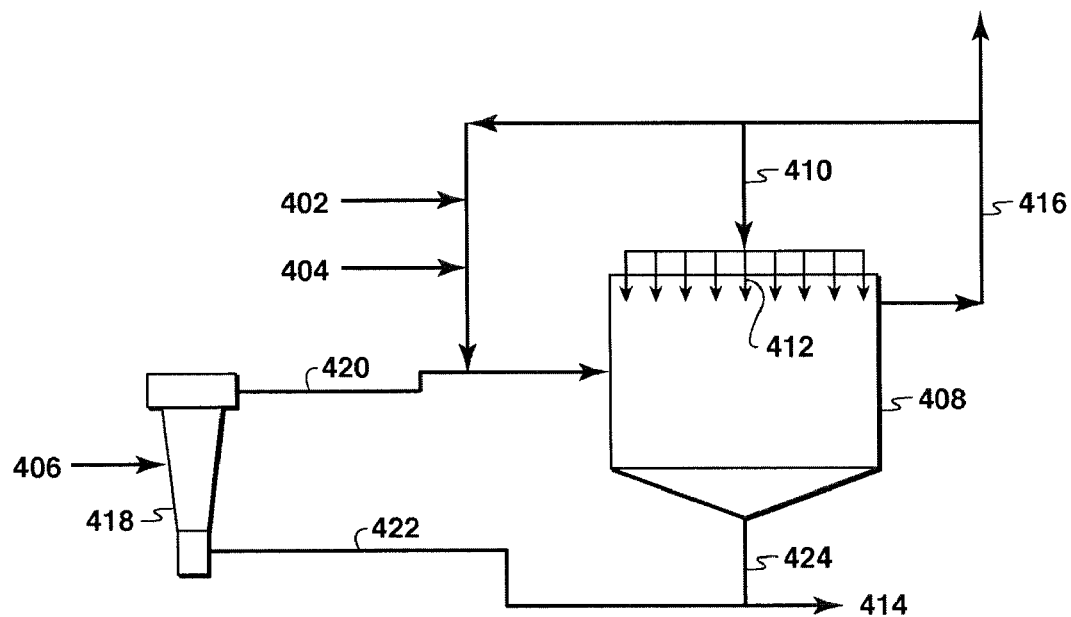
FIG. 4 is a schematic of an example of a dewatering process using a hydrocyclone and thickener unit in accordance with one disclosed embodiment.

FIG. 4 outlines a dewatering process in which a hydrocyclone is additionally used. This method is similar to the dewatering method of FIG. 3 and includes the following like elements and streams: flocculent 402, coagulant 404, tailings 406, thickener unit 408, spray water 410, spraying 412, stream to be combusted 414, and hot water 416. However, tailings 406 are fed to a hydrocyclone 418 to separate fine particles plus water, indicated as stream 420, which is then fed into the thickener unit 408, with course residue stream 422 which is combined with the fine residue 424 exiting the thickener unit 408 to form stream 414 to be combusted.

Figure 5:
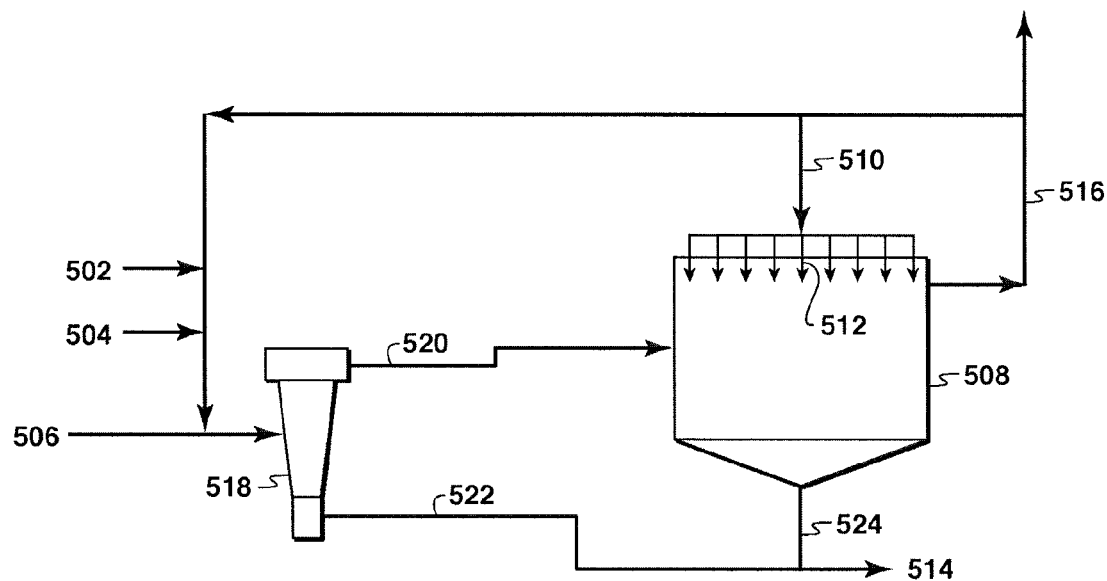
FIG. 5 is a schematic of another example of a dewatering process using a hydrocyclone and a thickener unit in accordance with one disclosed embodiment.

FIG. 5 outlines an alternative dewatering step where the flocculent 502 and coagulant 504 are added to tailings 506 prior to feeding the tailings into hydrocyclone 518. The fine particles and water 520 exit the hydrocyclone 518 and are fed into the thickener unit 508. Course residue 522 also exit the hydrocyclone 518 and is combined with fine residue stream 524 to form stream 514 for combustion. The hot water 516 is also shown exiting the thickener unit 508. Spray water 510 and spraying 512 are also shown.

Figure 6:
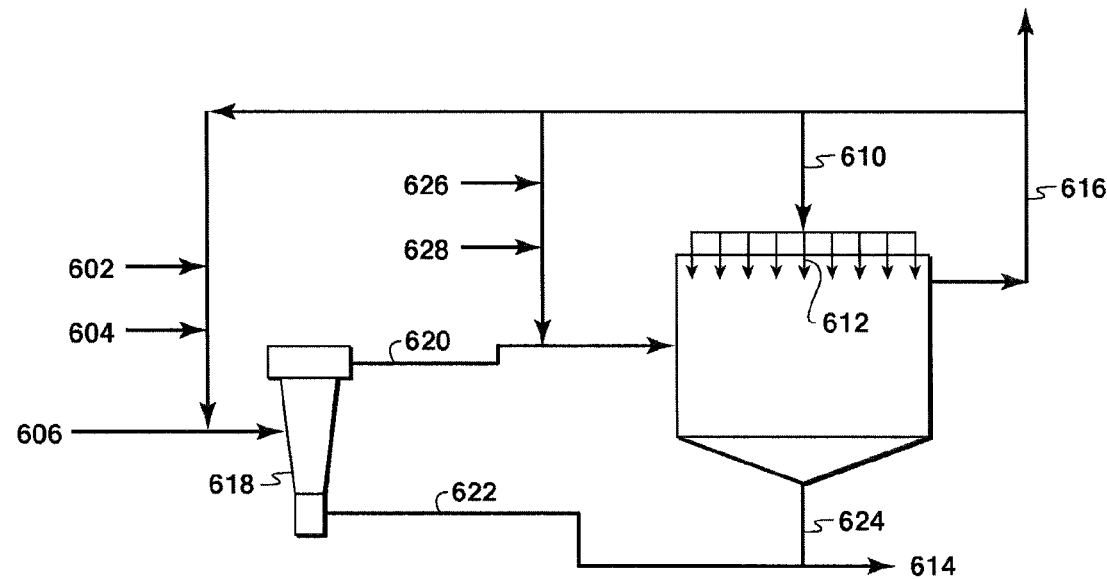
FIG. 6 is a schematic of another example of a dewatering process using a hydrocyclone and a thickener unit in accordance with one disclosed embodiment.

FIG. 6 outlines another dewatering step using a hydrocyclone and a thickener. As in previous figures, flocculent 602, coagulant 604, tailings 606, fine particles and water 620, course residue 622, fine residue 624, stream to be combusted 614, hot water 616, spray water 610, spraying 612, and hydrocyclone 618 are shown. In this process, additional flocculent 626 and additional coagulant 628 are fed to the water recycled into stream 620. As seen in FIGS. 5 and 6, flocculants and coagulants may be added at a single point or at multiple locations.

Figure 7:
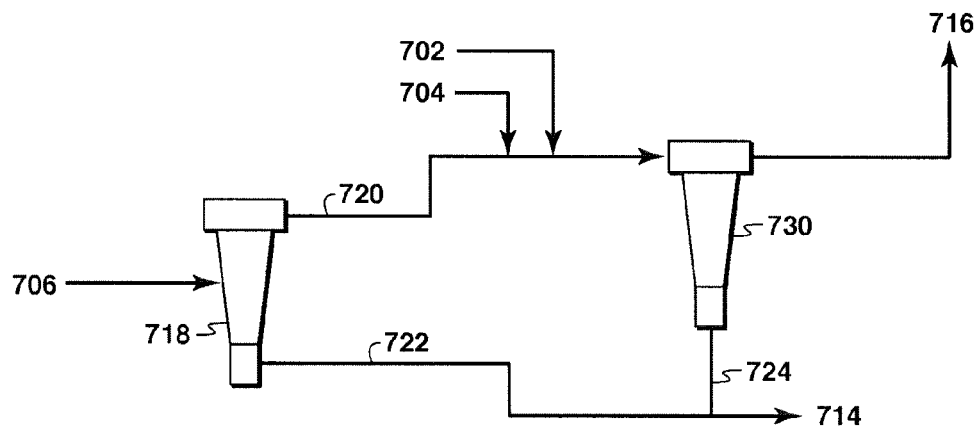
FIG. 7 is a schematic of an example of a dewatering process using two hydrocyclones in accordance with one disclosed embodiment.

FIG. 7 outlines a dewatering process using two hydrocyclones. Tailings 706 are fed into hydrocyclone 718 from which fine particles and water 720 are removed and combined with flocculent 702 and coagulant 704, which mixture is then added to the second hydrocyclone 730. Hot water 716 is extracted from the second hydrocyclone 730. Course residue stream 722 is also extracted from the first hydrocyclone 718, and is combined with fine residue stream 724 to form stream 714 for combustion.

Figure 8:
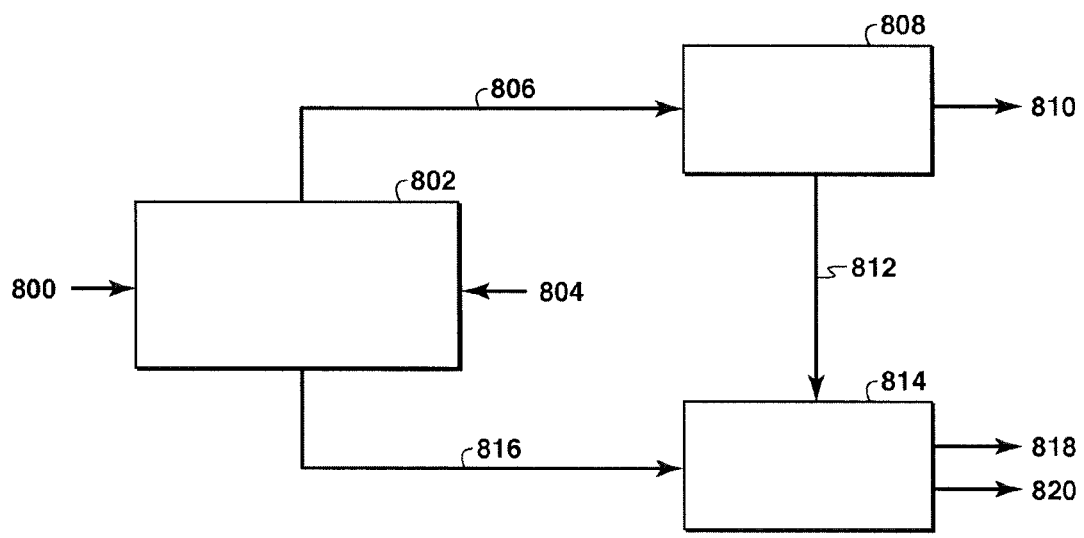
FIG. 8 is a schematic of an example of a process for separating combusted materials in accordance with one disclosed embodiment.

FIG. 8 outlines the separation of combusted materials. The dewatered tailings 800 are shown entering the combustion chamber 802. Limestone, urea, ammonia and fine tails 804 may also be added. Flue gas 806 is fed to a flue gas separation unit 808 from which cleaned flue gas 810 flows along with fly ash 812. The fly ash 812 is fed to a separation process 814 along with bottom ash 816 exiting the combustion chamber 802. In the separation process 814, some of the materials that may be separated include heavy minerals and metakaolin (collectively 818) and sand, gypsum, unreacted limestone, and impurities (collectively stream 820).

Figure 9:
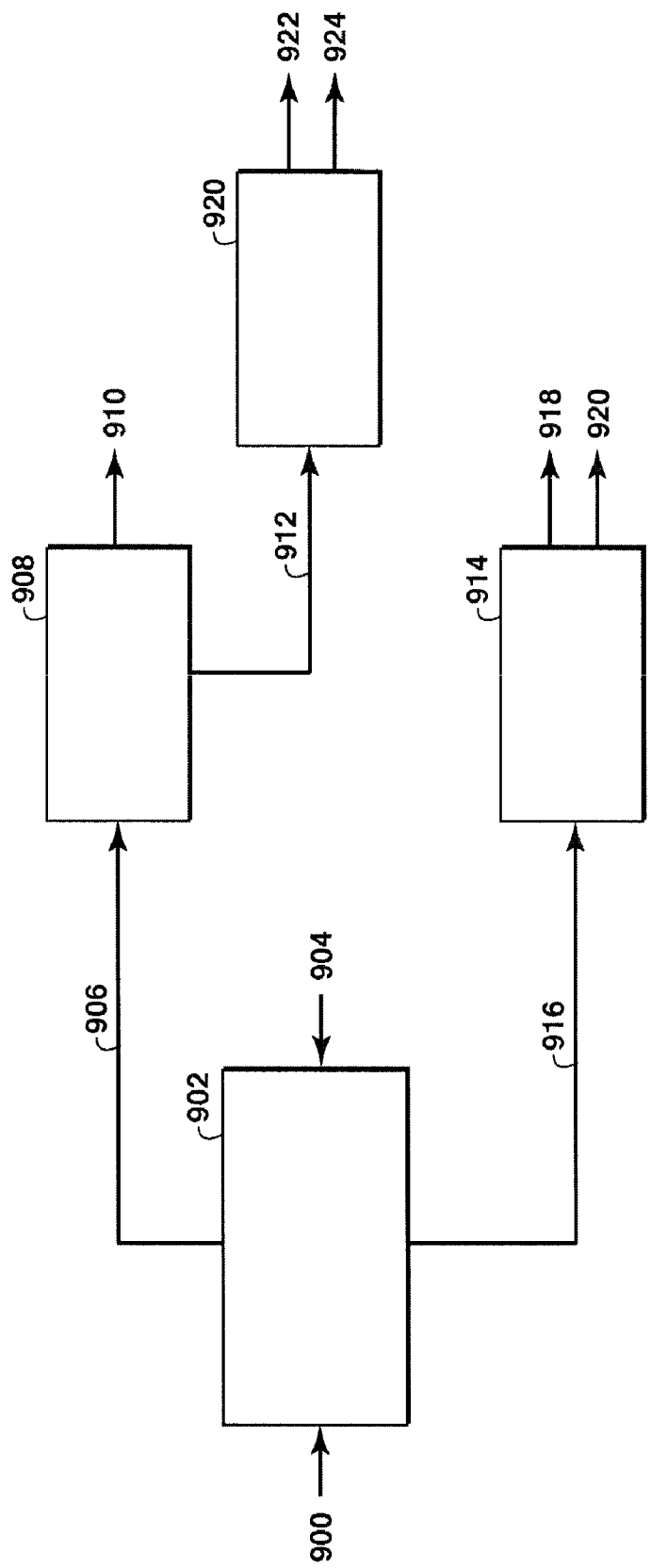
FIG. 9 is another example of a process for separating combusted materials in accordance with one disclosed embodiment.

FIG. 9 is another example outlining the separation of combusted materials. Elements 900, 902, 904, 906, 908, 910, 912, 914, 916, 918, and 920 are like elements or streams with corresponding numbers in FIG. 8. However, in FIG. 9, a distinct separation process 920 is used to separate elements such as heavy minerals and metakaolin (collectively 922) and sand, gypsum, unreacted limestone, and impurities (collectively 924) from the fly ash stream 912. Separation process 914 is used to separate such materials from the bottom ash 916.

Several other advantages of treating tailings streams through combustion in accordance with embodiments of the present invention may include, but are not limited to: recovering of hot water from TSRU tailings, eliminating or mitigating the need to purchase gas or other fuels for extraction, producing steam for extraction and mining processes, eliminating or reducing the volatile organic compound content of emissions from tailings, producing usable metakaolinite through dehydration synthesis of the kaolinite content of TSRU tailings, recovering heavy minerals and/or heavy metal oxides from TSRU tailings, reducing the need to store toxic streams in tailings ponds, and reducing the volume of tailings ponds.

The calcined fines comprising metakaolin and/or the metakaolin produced in the bottom ash may be used to solidify or stabilize a fine tailings stream (e.g. mature fine tailings (MFT)) resulting from bitumen extraction, or as an additive to cement. When added to cement, metakaolin may mitigate an alkaline condition and may provide a greater heat resistance. As an example of how metakaolin can be used as an additive to cement, Advanced Cement Technologies, LLC (Blaine, Wash., USA) markets PowerPozz™, a high reactivity metakaolin. According to their data sheet, the product has been successfully incorporated into applications for concrete and related products including high performance, high strength, and light weight concrete; precast and repetitive products; fiberglass products, ferrocement, and glass fiber reinforced concrete; dry bagged products such as mortars, stuccos, repair material, and pool plaster; and specialty uses such as blended cements, oil well cementing, shotcrete, decorative interior concrete fixtures, and sculture.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method for treating tailings from a bitumen extraction or froth treatment process, the tailings comprising sand, clay comprising kaolin, and water, and hydrocarbons, the method comprising:
dewatering the tailings to produce a dewatered tailings stream and a water stream;
combusting the hydrocarbons in the dewatered tailings stream in a combustion chamber to cause a chemical reaction converting kaolin into metakaolin and to produce a fly ash and a bottom ash; and
recovering calcined fines comprising metakaolin from the fly ash or from the bottom ash, or from both the fly ash and the bottom ash.

2. The method of claim 1 wherein the combustion chamber is a fluidized bed combustion chamber.

3. The method of claim 1 wherein the combustion chamber comprises a combustion bed comprising sand and fines.

4. The method of claim 1 wherein the bitumen froth treatment process is a paraffinic froth treatment process.

5. The method of claim 1 wherein the bitumen froth treatment process is a naphthenic froth treatment process.

6. The method of claim 1 wherein the tailings are tailings solvent recovery unit tailings.

7. The method of claim 1 wherein the combustion is carried out to convert kaolin to metakaolin at 500° C. to 1000° C.

8. The method of claim 1 further comprising feeding the water stream to a tailings solvent recovery unit for use as dilution water.

9. The method of claim 1 further comprising heating water to generate steam during the combusting step.

10. The method of claim 1 further comprising adding a fine tailings stream into the combustion chamber to increase the kaolin content in the combustion chamber or to control a maximum chamber temperature.

11. The method of claim 10, wherein the fine tailings stream comprises a middling stream, froth flotation tailings, naphthenic froth treatment tailings, or mature fine tailings.

12. The method of claim 1 further comprising adding the bottom ash to bitumen extraction tailings for solidifying or stabilizing the bitumen extraction tailings.

13. The method of claim 1 comprising recovering the calcined fines comprising metakaolin from the bottom ash.

14. The method of claim 13 further comprising separating the metakaolin from the calcined fines.

15. The method of claim 13 further comprising adding the recovered calcined fines to bitumen extraction tailings for solidifying or stabilizing the bitumen extraction tailings.

16. The method of claim 13 further comprising adding the recovered calcined fines to cement.

17. The method of claim 14 further comprising adding the metakaolin separated from the calcined fines to bitumen extraction tailings for solidifying or stabilizing the bitumen extraction tailings.

18. The method of claim 14 further comprising adding the metakaolin separated from the calcined fines to bitumen extraction tailings to cement.

19. The method of claim 1 further comprising adding the fly ash to bitumen extraction tailings for solidifying or stabilizing the bitumen extraction tailings.

20. The method of claim 1 further comprising adding the fly ash to cement.

21. The method claim 1 comprising recovering the calcined fines comprising the metakaolin from the fly ash.

22. The method of claim 21 further comprising separating the metakaolin from the calcined fines.

23. The method of claim 21 further comprising adding the recovered calcined fines to bitumen extraction tailings for solidifying or stabilizing the bitumen extraction tailings.

24. The method of claim 21 further comprising adding the recovered calcined fines to cement.

25. The method of claim 22 further comprising adding the metakaolin separated from the calcined fines to bitumen extraction tailings for solidifying or stabilizing the bitumen extraction tailings.

26. The method of claim 25 wherein the bitumen extraction tailings comprise mature fine tailings, thickened tailings, a middling stream, froth flotation tailings, or coarse tailings.

27. The method of claim 22 further comprising adding the metakaolin separated from the calcined fines to cement.

* * * * *